United States Patent [19]
Roskind

[11] Patent Number: 5,987,608
[45] Date of Patent: Nov. 16, 1999

[54] JAVA SECURITY MECHANISM

[75] Inventor: James A. Roskind, Redwood City, Calif.

[73] Assignee: Netscape Communications Corporation, Mountain View, Calif.

[21] Appl. No.: 08/856,479

[22] Filed: May 13, 1997

[51] Int. Cl.⁶ ................................................. G06F 12/14
[52] U.S. Cl. ......................................................... 713/200
[58] Field of Search .............................. 370/245; 380/23, 380/49, 3, 4; 395/186, 188.01, 200.32, 200.53, 200.54, 609, 650; 713/200

[56] References Cited

U.S. PATENT DOCUMENTS

| | | | |
|---|---|---|---|
| 5,560,008 | 9/1996 | Johnson et al. | 395/650 |
| 5,649,185 | 7/1997 | Antognini | 395/609 |
| 5,664,099 | 9/1997 | Ozzie et al. | 395/186 |
| 5,682,475 | 10/1997 | Johnson et al. | 395/188.01 |
| 5,727,145 | 3/1998 | Nessett et al. | 395/186 |
| 5,757,914 | 5/1998 | McManis | 380/23 |
| 5,761,421 | 6/1998 | Van Hoff et al. | 395/200.53 |
| 5,764,887 | 6/1998 | Kells et al. | 395/186 |
| 5,796,952 | 8/1998 | Davis et al. | 395/200.54 |
| 5,805,829 | 9/1998 | Cohen et al. | 395/200.32 |
| 5,812,529 | 9/1998 | Czarnik et al. | 370/245 |
| 5,822,434 | 10/1998 | Caronni et al. | 380/49 |
| 5,826,013 | 10/1998 | Nachenberg | 395/186 |
| 5,832,211 | 11/1998 | Blakley, III et al. | 395/188.01 |

*Primary Examiner*—Joseph E. Palys
*Assistant Examiner*—Nguyen Xuan Nguyen
*Attorney, Agent, or Firm*—Limbach & Limbach L.L.P.

[57] ABSTRACT

A computer program product is for use with a computer system that executes methods. Scope permission setting computer readable program code includes access request reception computer readable program code for receiving a request from a first method, executing at a first security level, to be dynamically empowered to access methods to be executed at a second security level, wherein the second security level is higher than the first security level. Dynamic capability activation computer readable program code is responsive to the access request reception code and includes static capability determination computer readable program code for determining if the first method is statically capable of accessing security methods generally and dynamic capability indication computer readable program code, responsive to the static capability determination code, for indicating in the activation record for the first method that the first method has been dynamically empowered to access security methods generally. Dynamic capability determination computer readable code, responsive to a request by the first method to access a particular security method, is for determining whether the activation record created for the first method includes an indication that the first method is capable of accessing security methods generally.

18 Claims, 2 Drawing Sheets

JAVA SECURITY MECHANISM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to security for Java systems and, in particular, to a method by which Java methods may gain access to restricted resources of a Java system.

BACKGROUND

Java is an object-oriented language that provides for building "applets" (pieces of networked software included, for example, in hyper-text markup language documents) and standalone applications. Java software consists of objects, where every "object" belongs to a "class". A class defines a template for the object. That is, from a class definition, multiple objects can be instantiated. Each instance of an object retains its own internal states (e.g., states of local variables) and interfaces.

Referring to FIG. 1, the Java methods are typically executed on a local computer (e.g., local client #1 150a; local client #2 150b; and local client #3 150c), connected to a server computer 102 of a computer network 100 (such as the internet). The server computer 102 has its own storage 104, and the local computer also has its own storage (e.g., local client #1 150a has local storage 154a; local client #2 150b has local storage 154b; and local client #3 150c has local storage 154c).

Class definitions are loaded into a Java system executing on the local computer using a class loader. (The discussion will use local client #1 150a as an example local computer.) When a new class is loaded into the Java system executing on the local computer 150a of the network 100, the class is associated with either the local computer 150a, or with the network 100 generally. Typically, objects of classes associated with the local computer 150a are located on the local hard drive 154a, and their classes are accessed without a class loader. Objects of classes accessed without a class loader have "superpowers" that allow these objects unrestricted access to the resources of the local computer 150a. A significant resource of the local computer 150a to which these objects have access is the file system on the local hard drive 154a.

This is in contrast to objects whose classes are loaded via a universal resource locator (URL) definition (even those classes on the local hard drive loaded via a URL that includes "file://"), whose access privileges are regulated by the AppletSecurity class of the Java system. The AppletSecurity class is a class that throws an exception when Java security policy has been violated. Specifically, classes that are loaded via the Java "class path" (i.e., located in the local file system at a location defined by the CLASSPATH environment variable) are loaded without a class loader, and objects of these classes have unrestricted access. As a result, the objects of classes accessed via the CLASSPATH may accidentally subvert the Java security policy. Many (if not all) of the Java "system library" classes are located via the CLASSPATH environment variable. By contrast, objects of classes loaded via a universal resource locator, or "URL", do not have these superpowers.

The task of ensuring that the classes accessed via the CLASSPATH environment variable do not violate the Java security policy, even if only accidentally, is an ergonomic nightmare. Not only must the "security" code (i.e., code that accesses important system resources) be checked for violations but, code that calls the "security" code must also be checked.

SUMMARY

In accordance with the present invention, a computer program product is provided for use with a computer system that executes methods. The computer program product includes scope permission setting computer readable program code means.

The scope permission setting computer readable program means includes access request reception computer readable program code means for receiving a request from a first method, executing at a first security level, to be dynamically empowered to access methods to be executed at a second security level, wherein the second security level is higher than the first security level.

Dynamic capability activation computer readable program code means is provided, responsive to the access request reception code means. The dynamic capability activation computer readable program code means includes static capability determination computer readable program code means for determining if the first method is statically capable of accessing security methods to be executed at at least a second security level. The dynamic capability activation computer readable program code means further includes dynamic capability indication computer readable program code means, responsive to the static capability determination code means, for indicating in the activation record for the first method that the first method has been dynamically empowered to access security methods generally.

Dynamic capability determination computer readable code means is provided, responsive to a request by the first method to access a particular security method, for determining whether the activation record created for the first method includes an indication that the first method is capable of accessing security methods generally.

DETAILED DESCRIPTION

In accordance with the invention, objects of classes loaded from the hard drive of a local client computer, after being found via the CLASSPATH are not automatically given superpowers to access restricted resources. Rather, objects of these classes are must proactively request superpowers. In accordance with the invention, objects of classes loaded via the CLASSPATH must "activate" their superpowers in a specific stack frame (that is, within a particular instantiation of a method object) by indicating in the stack frame for the method object that the method object has been empowered to access restricted resources. That is, an object of a class loaded via the CLASSPATH can be likened to "Clark Kent". A "Clark Kent" method object becomes a "Superman" method object when it indicates in its stack frame that it has activated its "superpowers". Another analogy is that method objects of classes loaded via the CLASSPATH are allowed to carry guns, but they are no longer required to carry the guns loaded and cocked at all times.

From a programmer's perspective, this is a vast improvement, in that it is much less likely that an applet will include a security flaw. From a security audit perspective, it is now possible to "grep" for code that, when executed, will cause an indication in the stack frame for the method that the method has activated its superpowers. By contrast, "wimpy" method objects have been loaded via a "URL" and can never attain superpower status.

In accordance with a preferred embodiment of the invention, an object of a class may "inherit" superpowers from its caller, rather than having to explicitly activate its own superpowers. This facilitates the writing of code for objects that can work both on behalf of classes loaded via the CLASSPATH (e.g., system classes) and also on behalf of applet classes. Thus, the Java security system in accordance with the preferred embodiment of the invention, rather than asking just if a method that requests access to restricted resources is superpowered, also checks to see if the method is potentially superpowered. If so, the Java security system checks the stack frames of methods further up in the calling thread of the method that requests access to restricted resources.

The preferred embodiment thus protects against "luring" attacks, where an attacker method object may lure an innocent (and superpowered) thread into calling an attacker's code. In accordance with the preferred embodiment of the invention, the attacker's code would be considered to be "wimpy" applet code that could never be superpowered and, hence, would neutralize any powers that were indicated in the caller's stack frame.

Figure 1:
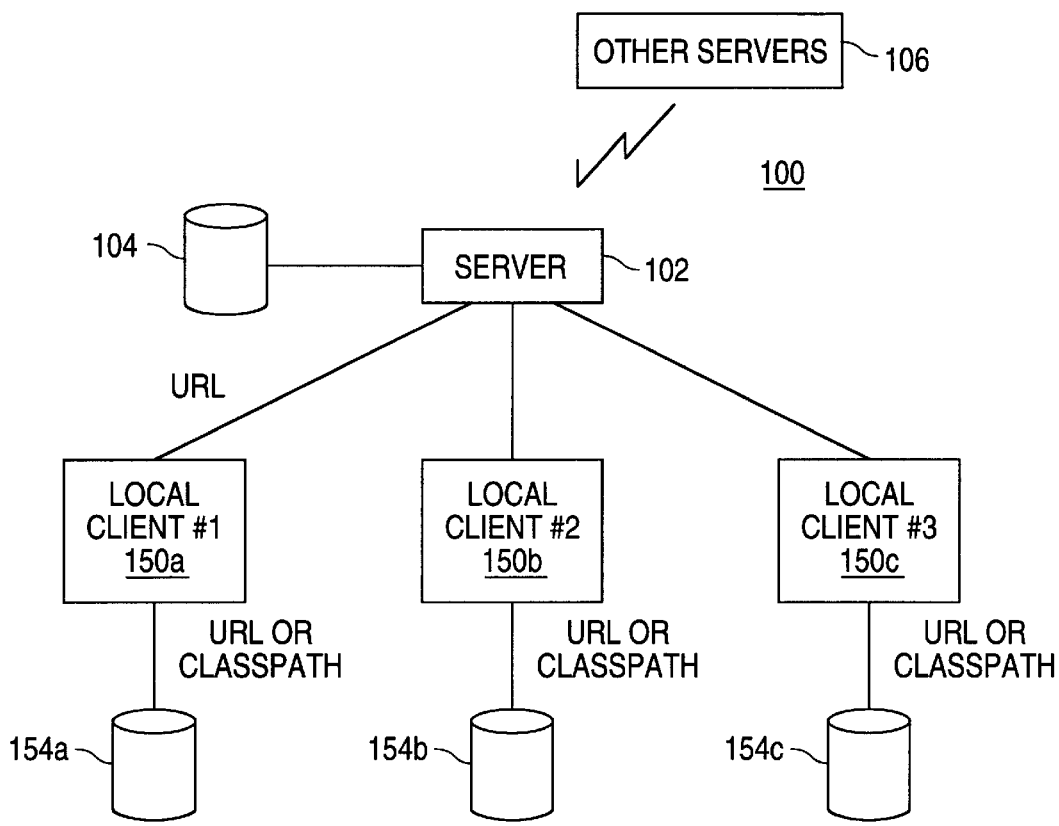
FIG. 1 illustrates how Java methods are distributed and executed in computer network.
Figure 2:
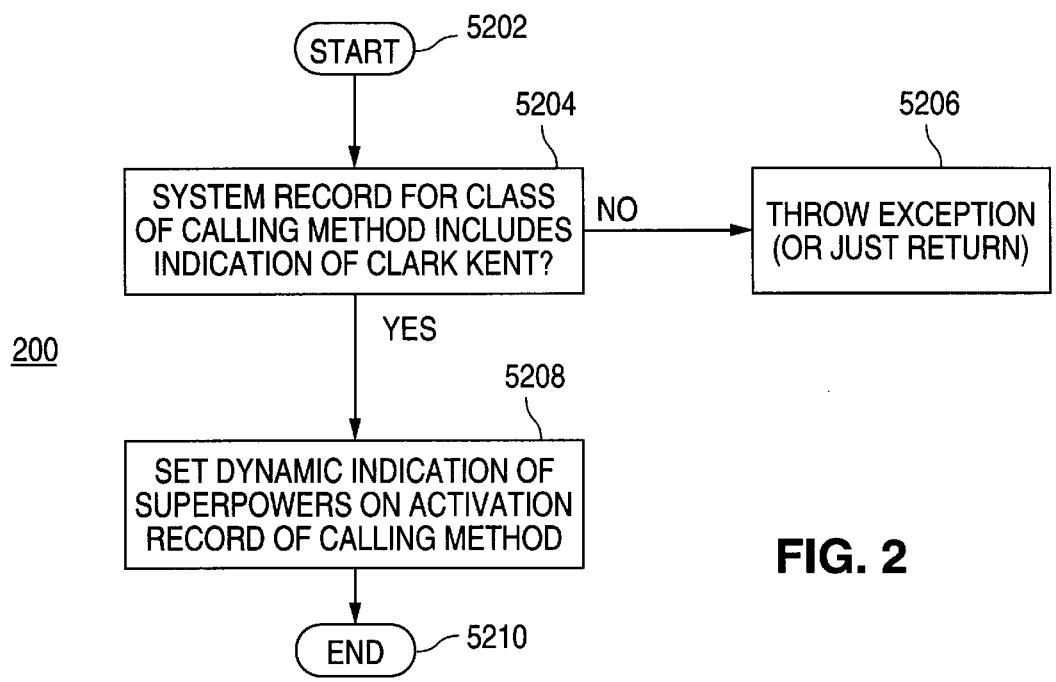
FIG. 2 illustrates steps taken by a method to activate "superpowers" powers.

Details of an embodiment of the invention are now discussed with reference to FIGS. 2 through 4. FIG. 2 is a flow chart illustrating steps to be taken by a method object to activate its superpowers powers (analogous to Clark Kent entering the phone booth and donning his cape). The flow chart begins at step S202. At step S204, the system record for the class of the calling method is inspected to determine if the system record includes an indication that the calling method is a "Clark Kent" method (i.e., potentially superpowered by virtue of having been loaded without a class loader). If not, at step S206, an exception is thrown. (Alternately, the method may just return.) If it is found at step S204 that the system record for the class of a calling method includes an indication that the calling method is a "Clark Kent" method, then at step S208 a dynamic indication that the calling method now has superpowers is set on the activation record (i.e. in the stack frame) of the calling method. At step S210, the procedure ends.

Figure 3:
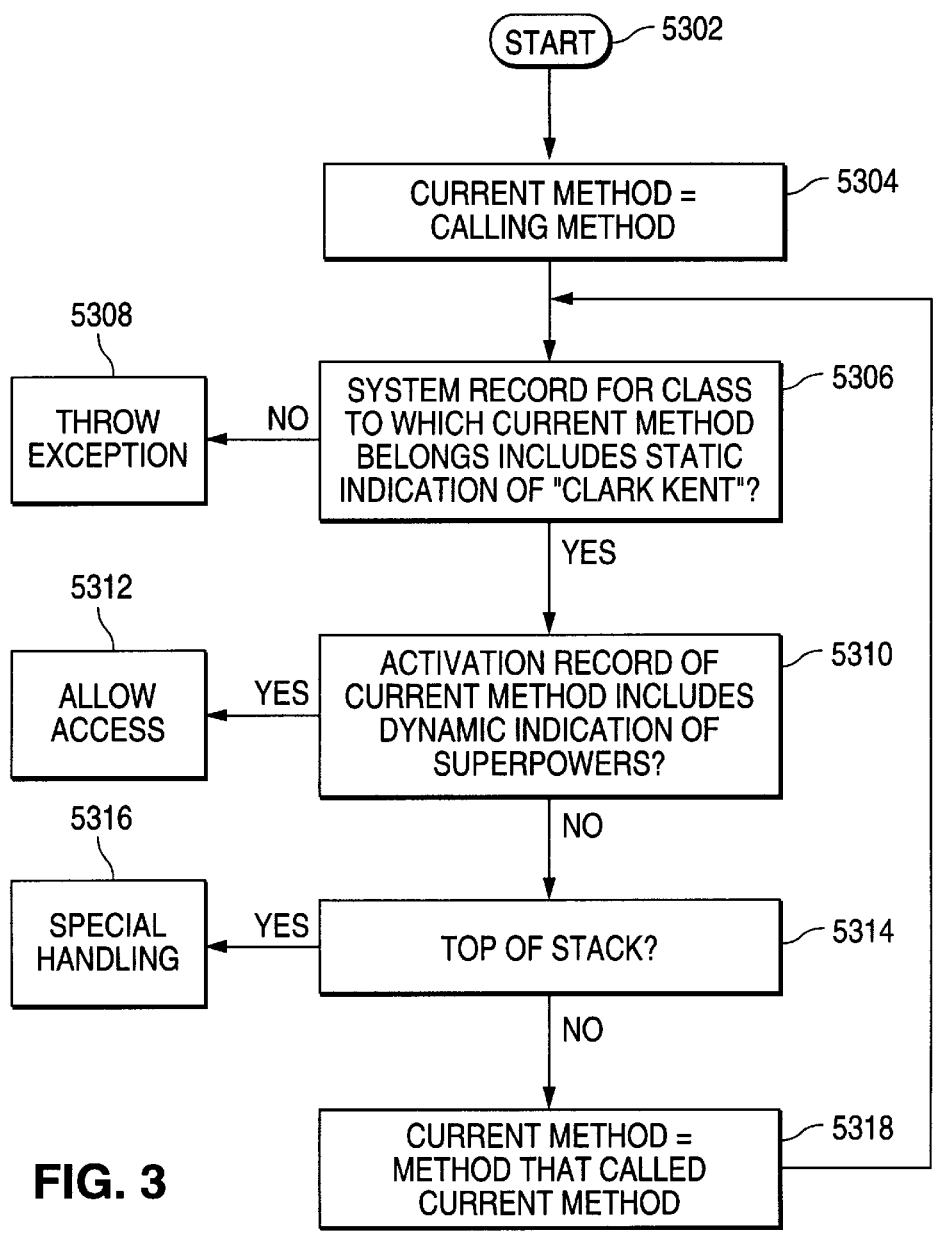
FIG. 3 illustrates steps taken by Java security code when a method attempts to access restricted resources.
Figure 4:
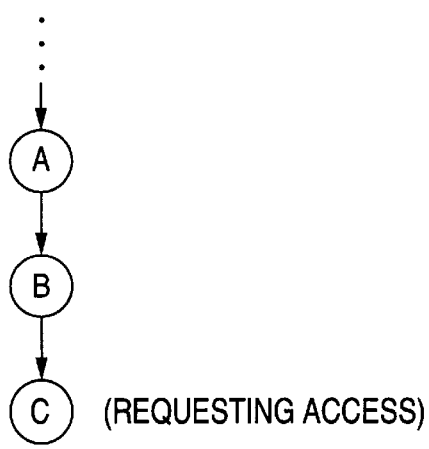
FIG. 4 illustrates a calling sequence of various Java methods.

FIG. 3 is a flow chart that illustrates the procedure followed by the Java security code, in accordance with the preferred embodiment of the invention, when a method attempts to access restricted resources. The procedure starts at step S302. At step S304, a current_method variable is set equal to the calling method. At step S306, the system record for the class to which the method pointed to by current_method belongs is inspected to see if it indicates that the method is a "Clark Kent" method. If not, then the method is a "wimp" method and an exception is thrown at step S308. Otherwise, the activation record (stack frame) of the method pointed to by current_method is inspected to determine if it includes a dynamic indication that the method has superpowers. If so, at step S312, access is allowed to the restricted resources. If not, the procedure continues at step S318. (Step S314, which handles top-of-stack processing, will be discussed later.) At step S318, the current_method variable is set to point to the method that called the current_method. Then, steps S306 and S310 are repeated until either an exception is thrown at step S308, access is allowed at step S312, or the top of the stack is reached at step S314.

Five example executions of the procedure shown in FIG. 3 are now discussed with reference to FIG. 4 and Tables 1A and 1B. FIG. 4 illustrates a situation whereby a method A has been called. Method A calls method B, and method B calls method C. Method C is requesting access to restricted resources. Referring now to Table 1A, example 1 shown therein is discussed. The column "S" indicates whether the method belongs to a class that has a static capability to access restricted system resources (i.e., is a "Clark Kent" class). The column "D" indicates whether the stack frame of the method, at the time method C has requested access to restricted resources, has a dynamic indication that it is able to access restricted resources (i.e., is a "Superman" method). "Y" stands for yes; "N" stands for no; and "DC" stands for "don't care". In Example 1, method C is both statically empowered to access restricted resources, and the stack frame of method C includes a dynamic indication that method C is allowed to access restricted resources. That is, method C started out as a "Clark Kent" method, and at some point became a fully-activated "Superman" method. Thus, for example 1, the procedural flow of FIG. 3 is as follows. The procedure starts at step S302. At step S304, current_method is set to be equal to method C. At step S306, the result is yes, so method C is allowed access to the restricted resource.

In example 2, method C is a "wimp" method. That is, there is no indication in the system record for the class to which method C belongs that method C may ever access restricted resources. Thus, when the procedure in the flow chart of FIG. 3 is followed, for example 2, the answer at step S306 is no. Thus, an exception is thrown at step 308.

In example 3, method C is a "Clark Kent" method, but the stack frame of method C does not include an indication that method C has been given superpowers. Method B, also, is a "Clark Kent" method. The stack frame of method B includes a dynamic indication that method B is currently enabled to access restricted resources. Thus, when the procedure of FIG. 3 is followed for example 3, the answer at step S306 for method C is yes. Thus, execution continues at S310. The answer at step S310 for method C is no. Thus, disregarding the top-of-stack processing at step S314, processing continues at step S318 where the current_method variable is set to method B. At step S306 for method B, the answer is yes. Thus, processing continues at step S310. At step S310 for method B, the answer is yes. Thus, processing continues at step S312, where access to the restricted resources is allowed.

In example 4, since the system record for the class to which method C belongs includes a static indication that method C may access restricted resources, method C is a "Clark Kent" method. However, the activation record of method C does not include an indication that the power to access restricted resources have been activated. Method B, also, is a "Clark Kent" method, but neither does the activation record of method B include an indication that the powers to access restricted resources has been activated for method B. Method A in example 5 is a "wimp" method, since the system record for the class to which method A belongs does not include an indication that method A can access restricted resources.

Thus, when the procedure in the flow chart of FIG. 3 is followed for example 5, at step S304 current_method is set to method C. At step S306 for method C, the answer is yes. At step S310 for method C, the answer is no. Then, at step S318, the current_method variable is set to method B. At step S306 for method B, the answer is yes. At step S310 for method B, the answer is no. Thus, processing continues at step S318 where the current_method variable is set to method A. At step S306 for method A, the answer is no. Thus, processing continues at step S308, where an exception is thrown.

This patent application includes a software appendix which is attached hereto as Appendix A. Appendix A discloses a preferred embodiment for implementing the security method described above. Appendix A is herein incorporated as an integral part of this disclosure.

In summary, in accordance with the present invention, a general philosophy of the "Principle of Least Privilege" has been adhered to. The idea is that for secure systems, all actors should be kept at the least possible power level (i.e., there is no reason to grant an actor immense powers when trivial tasks are all that will be performed by the actor). The issues surrounding this principle is that an attacker will often try to subvert the mission of a piece of code. Specifically, attackers will often give out of range values, and hope to cause a piece of code to perform tasks that the author never intended to perform. This Principle of Least Privilege combats such subversive attacks by trying to avoid the possession of powers, and hence reducing the window of vulnerability. Simply put, a program is only susceptible to significant subversion while it possesses significant powers.

In accordance with the invention, there are two ways that power is restricted: a) a temporal restriction; and b) a lexical restriction. The fact that the power is only turned on for some portion of the execution of a method (while the stack annotation is activated) implies that the attacker has a small temporal window to implement a subversive attack. The fact that the powers are discarded automatically at the completion of the function call (as a result of the stack annotation) ensures that the duration is very restricted. The fact that there are only a few physical (lexical) lines of code where large powers are possessed, means that the region of code that can be attacked, and hence that must be scrutinized and defended, is very small. Again the fact that privileges are discarded at the function termination automatically ensures that the critical code segment cannot proceed beyond the lexical end of the function. Together those two elements significantly lessen the amount of unnecessary privilege possessed by a program.

In accordance with further embodiments, the principle of least privilege is applied to a "capability model". Individual capabilities are allowed to be granted in "signed classes". For example, permission can be granted to write files, without granting permission to read files. Permission can be granted to make network connections, without granting permission to interrogate system properties (e.g., current user id; current directory; etc.). In short, the capabilities granted to a piece of code can be restricted to an arbitrary subset of all possible privileges. Significantly, which classes get which capabilities is determined by the "signing" and need not be assigned strictly on the basis of being loaded across a network (via a URL) versus being loaded from a local file system without a class loader. Again, all the temporal and lexical restrictions discussed above may apply.

A particular implementation is provided as Appendix B. Appendix B is herein incorporated as an integral portion of this disclosure.

APPENDIX A

Copyright (c) 1996 Netscape Communications Corporation. All rights reserved.

The following is a little helper function that is used to combine multiple privs into a single result. It is used when we find something on the stack that has multiple principals, and some are allowed access, and other are perchance forbidden, and we need to see what it all adds up to.

```
/**
 * add( ) method takes two perms and returns a new perm that has the
 * following rules.
 *
 * ALLOWED + ALLOWED = ALLOWED     1 + 1 = 1
 * ALLOWED + BLANK  = ALLOWED      1 + 2 = 1
 * BLANK   + BLANK  = BLANK        2 + 2 = 2
 * ALLOWED + FORBIDDEN = FORBIDDEN 1 + 0 = 0
 * BLANK   + FORBIDDEN = FORBIDDEN 2 + 0 = 0
 * FORBIDDEN + FORBIDDEN = FORBIDDEN 0 + 0 = 0
 *
 */
jint
add_Privileges(jint perm1, jint perm2)
{
    if(perm1 < perm2) return perm 1;
    return perm 2;
}
...
```

The most recent name for the method of checking to see what is on the stack is netscape.security.PrivilegeManager.checkPrivilegeEnabled( ).
jbool throwException)

There are two possible interfaces. When we fail, we could either return a boolean FALSE, or we can throw an exception. This last argument tells us what the caller wants us to do.

```
{
    ExecEnv *ee;
    struct javaframe *frame, frame_buf;
    struct netscape_security_Target *target;
    struct netscape_security_PrivilegeTable *annotation;
    struct netscape_security_Privilege *privilege;
    jobjectArray prinAry;
    ClassClass *cb;
    jint depth = 0;
    jint perm;
    jint scopePerm;
```

The following is the native implementation of that function. This function walks up the Java stack, looking at each stack frame (after bypassing some initial number of frames). At each level, it checks to see if the frame has been "enabled" for the specific privilege. If it has, then the routine is done, and it returns cleanly. If the frame has not been annotated with an ALLOW marking, then it considers whether the frame *could* have made the annotation. This test is done by examining the Principal associated with the stack frame. If the principal could not have empowered (annotated) the current frame, then the function terminates abruptly by throwing an exception. Lastly, if there was no decisive reason to terminate the scan at that level, the routine continues up the stack frames.

Minor comments below . . . .

```
/*** public native checkPrivilegeEnabled (Lnetscape/security/Target;IV ***/
JRI_PUBLIC_API(jbool)
native_netscape_security_PrivilegeManager_checkPrivilegeEnabled(
    JRIEnv* env,
    struct netscape_security_PrivilegeManager* self,
    jobjectArray targetAry,
``` taregtAry is the array of targets that we are checking for enablement on the stack.

```
    jint callerDepth,
``` callerDepth is the number of stack frames to skip (it brings us back to the frame where the real check call was done).

```
    struct java_lang_Object *data,
```

To handle parameterized targets, we always pass in a piece of data to hand to the targets (in case it needs it to make a decision).

```
    privilege_clazz = JRI_FindClass(env,
        classname_netscape_security_Privilege);
    target_clazz = JRI_FindClass(env, classname_netscape_security_Target);
    noOfTargets = JRI_GetObjectArrayLength(env, targetAry);
```

Next we prepare to iterate up through the stack frames.

```
    for (frame = ee->current_frame ; frame != 0; ) {
```

We ignore "fake frames" that don't correspond to actual java method calls . . .

```
        if (frame->current_method != 0) {
```

We only start inquiring once we've skipped a few frames . . .

APPENDIX A-continued

```
        jint prinPerm;
        int saw_non_system_code = 0;
        struct java_lang_Class* privilege_clazz;
        struct java_lang_Class* target_clazz;
        int noOfTargets;
        int idx;

/* We start with some internal error checking.
*/
        if(!targetAry) {
            JRI_ThrowNew(env,
                class_java_lang_NullPointerException(env),
                "internal error - null target array?");
            return (jbool)FALSE;
        }
        ee = EE( );
        jri_initialize(env);

/* Now we'll look at details for one specific target . . .
* frame->annotation holds PrivilegeTable, describing
* the scope privileges of this frame. We'll check
* if it permits the target, and if so, we just return.
* If it forbids the target, we'll throw an exception,
* and return. If it's blank, things get funny.
*
* In the blank case, we need to continue walking up
* the stack, looking for a non-blank privilege. To
* prevent "luring" attacks, these blank frames must
* have the ability that they *could have requested*
* privilege, but actually didn't. This property
* *insures that we don't have a non-permitted (attacker)
* class somewhere in the call chain between the request
* for scope privilege and the check for privilege.
*/
        cb = fieldclass(&frame->current_method->fb);
/*
* no Class associated with stack frame? hmm . . .
*/
        if(cb == NULL) {
            JRI_ThrowNew(env,
                class_java_lang_NullPointerException(env),
                "internal error - no class for stack frame?");
            return(jbool)FALSE;
        }
        prinAry = cbPrincipalAry(cb);
        if (depth >= callerDepth) {

/* Finally we are going to do some checking. We'll have to combine the
   results from all the targets in our array of targets. If we find a
   FORBID for any of them, then we'll end up quitting.
*/
            scopePerm = netscape_security_Privilege_BLANK;
            prinPerm  = netscape_security_Privilege_BLANK;
/* Run the check across all the targets in our array . . .
*/
            for (idx = 0; idx < noOfTargets; idx++) {
                jref target_jref = JRI_GetObjectArrayElement(env,
                    targetAry, idx);
                target = (netscape_security_Target *)/*XXX*/target_jref;
                if(!target) {
                    JRI_ThrowNew(env,
                        class_java_lang_NullPointerException(env),
                        "internal error - a null target in the Array");
                    return (jbool)FALSE;
                }
                annotation = (struct netscape_security_PrivilegeTable *)
                    frame->annotation;
/*
* If there isn't a annotation, then we assume the default
* value of blank and avoid allocating a new annotation.
* The above means we treat a missing annotation as if it were BLANK. This
* saves a lot of wasted allocation of empty annotation objects.
*/
                if (annotation) {
/* A real annotation contains a list of privs for each target . . . to lets
   see what this annotation has to say about the target we're considering . . .
*/
                    privilege = netscape_security_PrivilegeTable_get_1(env,
                        annotation,
                        target);
                    if (exceptionOccurred(ee))
                        return(jbool)FALSE;
                    sysAssert(privilege);
                    perm = netscape_security_Privilege_getPermission(env,
                        privilege);
                    sysAssert(!exceptionOccurred(ee));
/* Here we tally this priv, in addition to what we have so far . . .
*/
                    scopePerm = add_Privileges(perm, scopePerm);
/* While we're here . . . lets also consider if this class *could* have
   empowered itself . . . so lets see what principals are associated with
   this class . . .
*/
                }
            }
```

APPENDIX A-continued

```
        if(prinAry != NULL) {
            privilege =
                netscape_security_Target_checkPrivilegeEnabled(
                    env,target,prinAry,data);
            if (exceptionOccurred(ee)) {
                return (jbool)FALSE;
            }
            sysAssert(privilege);
            perm = netscape_security_Privilege_getPermission(env,
                                                             privilege);
            sysAssert(!exceptionOccurred(ee));
            scopePerm = add_Privileges(perm, scopePerm);

perm =
                netscape_security_PrivilegeManager_getPrincipalPrivilege_1(env,self,target,prin
Ary);
            sysAssert(!exceptionOccurred(ee));

//  ... and lets tally that result into information about all the
//  principals and their permissions ...

prinPerm = add_Prvileges(perm, prinPerm);
            saw_non_system_code = 1;
        }

//  Whew. We're done scanning all the targets, so now we decide whether to
//  continue the stack scan or to just return.

if (scopePerm == netscape_security_Privilege_ALLOWED) {

//  If we found an ALLOWED annotation ... we're golden ...

return (jbool)TRUE;
        }
    }

//  Finally, if we run out of call-stack frames, we fail as though the
//  permission was disabled.

/*
     * If we get here, there is no non-blank capability on the stack,
     * and there is no ClassLoader, thus give privilege for now
     */
    if(saw_non_system_code)
        if(throwException)
            JRI_ThrowNew(env,
                class_netscape_security_ForbiddenTargetException(env),
                "access to target forbidden");
    }
    JRI_ThrowNew(env,
        class_netscape_security_NoClassLoaderException(env),
``` but if we found a FORBIDDEN annotation (i.e., a scopePermission) ...

```
            if ((scopePerm == netscape_security_Privilege_FORBIDDEN) ||
``` then we should stop.
OR similarly ... if we saw some non-system code (we're extra friendly
to system code) and the principal didn't have the potential to ALLOW
the annotation, ... then again we should stop ...

```
                (saw_non_system_code &&
                 (prinPerm != netscape_security_Privilege_ALLOWED))) {
```

... but stop with a failure mode of either an exception or a return.

```
                if (throwException)
                    JRI_ThrowNew(env,
                        class_netscape_security_ForbiddenTargetException(env),
                        "access to target forbidden");
                return (jbool)FALSE;
            }
        }
```

Finally, if we get here, then we should continue scanning up the stack
frame. There is some subtlety here to deal with JIT'ed code, which
requires special faked-up stack frames ... but these next few lines get
us to the next effective stack of the call chain.

```
                frame = frame->current_method->fb.access &
ACC_MACHINE_COMPILED?
                    CompiledFramePrev(frame, &frame_buf): frame->prev;
                depth++;
        } else {
            frame = frame->prev;
        }
    }
}

(
    JRIEnv* env,
    structnetscape_security_PrivilegeManager* self,
    jint callerDepth)
{
#ifdefXP_MAC
#pragma unused (self)
endif
    struct javaframe *frame, frame_buf;
    ClassClass   *cb;
    int depth = 0;

jri_initialize(env);

for(frame = EE()->current_frame; frame !=0;) {
        if(Frame->current_method != 0) {
            if(depth >= callerdepth) {
```

APPENDIX A-continued

```
            return(jbool)FALSE;
        }

The following is a helper function that pulls a list of all the
Principals from the stack. It is called "Unsafe" because the caller
is given the actual arrays . . . which means the caller *could* change
this list (gulp). As a result, we only pass around this "unsafe"
version within the class, and NEVER hand it back to Joe-Average user.
It is a private helper function.

/*** private native getClassPrincipalsFromStackUnsafe
**I[Lnetscape/security/Principal; ***/
        JRI_PUBLIC_API(jref)
native_netscape_security_PrivilegeManager_getClassPrincipalsFromStackUnsafe
                    return NULL;
                }
                return cbPrincipalAry(cb);
            }
ACC_MACHINE_COMPILED?
                CompiledFramePrev(frame, &frame_buf) : frame->prev;
                depth++;
            } else {
                frame = frame->prev;
            }
            /*
             * if we got here, the callerDepth was probably longer than the stack
             */
            JRI_ThrowNew(env,
                    class_java_lang_IndexOutOfBoundsException(env),
                    "getClassPrincipalsFromStack stack callerDepth greater than stack
depth");
            returnNULL;
        }

Here is another private helper function that accesses the internals of
a class, and gets a list of principals. The last method scanned the
entire stack, and returned an array with one list for each stack
frame. This is the lower-level helper that just looks at a class, and
gets the list of principals for the class (again . . . unsafe . . . but
private).

/*** private native getClassPrincipalsUnsafe (I)[Lnetscape/security/Principal;
***/
        JRI_PUBLIC_API(jref)
native_netscape_security_PrivilegeManager_getClassPrincipalsUnsafe(
            JRIEnv* env,
```

```
            cb = fieldclass(&frame->current_method->fb);
            /*
             * no Class associated with stack frame? hmm . . .
             */
            if(cb == NULL) {
                JRI_ThrowNew(env,
                    class_java_lang_NullPointerException(env),
                    "internal error - no class for stack frame?");
                return NULL;
            }
            /*
             * If there is a class loader, then there should be a Princiapl
             */
            if (cbLoader(cb) && (cbPrincipalAry(cb) == NULL) {
                JRI_ThrowNew(env,
                    class_netscape_security_ForbiddenTargetException(env),
                    "internal error - no Principal for stack frame?");
struct netscape_security_PrivilegeManager* self,
struct java_lang_Class *a)
{
#ifdef XP_MAC
#pragma unused (self)
endif
            ClassClass *cb;
jri_initialize(env);
            if((a == NULL) || ((cb = unhand((HClass *)a)) == NULL)) {
                JRI_ThrowNew(env,
                    class_java_lang_NullPointerException(env),
                    "internal error - no class block for Principal?");
                return NULL;
            }
            /*
             * If there is a class loader, then there should be a Principal
             */
            if (cbLoader(cb) && (cbPrincipalAry(cb) == NULL)) {
                JRI_ThrowNew(env,
                    class_netscape_security_ForbiddenTargetException(env),
                    "internal error - no Principal for stack frame?");
                return NULL;
            }
            return cbPrincipalAry(cb);
        }
```

Stack annotations are stored as "PrivilegeTable". The following gets
the actual annotation from the stack. This is an unsafe method (to
much exposure to the caller to change the values), but it is only used
privately.

APPENDIX A-continued

```
/*** private native getPrivilegeTableFromStackUnsafe
 (I)Lnetscape/security/PrivilegeTable; ***/
JRI_PUBLIC_API(struct netscape_security_PrivilegeTable *)
native_netscape_security_PrivilegeManager_getPrivilegeTableFromStackUnsafe(
        JRIEnv* env,
        struct netscape_security_PrivilegeManager* self,
        jint callerDepth,
        jbool createIfNull)
{
#ifdef XP_MAC
#pragma unused (self)
endif struct javaframe *frame, frame_buf;
    int depth = 0;
    ExecEnv *ee;

jri_initialize(env);
    ee = EE( );

for (frame =ee->current_frame; frame != 0 ;) {
        if (frame->current_method != 0) {
            if (depth >= callerDepth) {
                /*
                * it's possible for the annotation to be NULL, meaning
                * nobody's ever asked for it before. The correct
                * response is to create a new PrivilegeTable (with
                * default "blank forever" privileges), assign that
                * to the annotation, and return it.
                */
                if(createIfNull && (frame->annotation == NULL)) {
                    JHandle * privilege = (JHandle *)
                    class_java_lang_IndexOutOfBoundsException(env),
                    "getPrivilegeTableFromStack stack callerDepth greater than stack
depth");
                    return NULL;
                }

The following comment says it all. IT was put in to support some
beta2 test code, which disables a pile of security checking, but
allows developers to get to play with the features before the complete
UI and crypto structure is coded.

/* XXX: Hack for Beta2 */
static int (*IsJavaSecurityEnabledCallback)( );

JRI_PUBLIC_API(void)

netscape_security_PrivilegeTable_new(env, JRI_FindClass(env,
                classname_netscape_security_PrivilegeTable));
            if (exceptionOccurred(ee)) {
                /*
                * no memory?!??! return NULL, and let our
                * parent deal with the exception
                */
                return NULL;
            }
            sysAssert(privilege != NULL);
            if (frame->current_method->fb.access &
ACC_MACHINE_COMPILED) {
                SetCompiledFrameAnnotation(frame, privilege);
            } else {
                frame->annotation = privilege;
            }
            return (struct netscape_security_PrivilegeTable *)
                (privilege);
        }
        return (struct netscape_security_PrivilegeTable *)
            (frame->annotation);
    }
    if (frame->current_method->fb.access &
ACC_MACHINE_COMPILED?
            CompiledFramePrev(frame, &frame_buf) : frame->prev;
    depth++;
} else {
    frame = frame -> prev;
}
}
/*
* if we got here, the callerDepth was probably longer than the stack
*/
JRI_ThrowNew(env,
/* XXX: End of hack for Beta */

The next few functions have to do with calls to the underlying crypto
API, and are really not significant to the patent work.

extern JRI_PUBLIC_API(jint)
native_netscape_security_Principal_getZigPtr(
        JRIEnv* env,
        struct netscape_security_Principal* self,
        struct java_lang_Class *cl
        )
{
#ifdef XP_MAC
#pragma unused (self)
endif
```

APPENDIX A-continued

```
setIsJavaSecurityEnabledCallback(int (*fp)( ) )
{
    IsJavaSecurityEnabledCallback = fp;
}

JRI_PUBLIC_API(jbool)
native_netscape_security_PrivilegeManager_getJavaSecurityEnabled(
    JRIEnv* env,
    struct netscape_security_PrivilegeManager* self)

#ifdef XP_MAC
#pragma unused (self)
endif
    if (!IsJavaSecurityEnabledCallback) {
        return (jbool)TRUE;
    }
    return (jbool)IsJavaSecurityEnabledCallback( );
    signatureAttributeCallback = fp;
} extern JRI_PUBLIC_API(struct java_lang_String *)
native_netscape_security_Principal_getCertAttribute(
    JRIEnv* env,
    struct netscape_security_Principal* self,
    jint zig_arg,
    jint attrib,
    jbyteArray finger_print
    )
#ifdef XP_MAC
#pragma unused (self)
endif
    void* zig = (void *)zig_arg;
    char *result;
    unsigned long length;
    void *data = (void *)JRI_GetByteArrayElements(env, finger_print);
    if ((zig_arg == 0) || (!signatureAttributeCallback)) {
        return JRI_NewStringUTF(env, "", 0);
    }
    if (signatureAttributeCallback(attrib, zig, data, (void **)&result,
                                    &length) < 0) {
        JRI_ThrowNew(env,
            class_netscape_security_ForbiddenTargetException(env),
            "invalid certificate fingerprint");
        return JRI_NewStringUTF(env, "", 0);
    }
    return JRI_NewStringUTF(env, result, length);
    ClassClass *cb;
    if ((cl == NULL) || ((cb unhand(((HClass *)cl)) == NULL)) {
        return(jint)0;
    }
    return (jint)cbZigPtr(cb);
} static int (*signatureAttributeCallback)(int attrib, void *zig, void *data, void
    **result, unsigned long *length);
JRI_PUBLIC_API(void)
setSignatureAttributeCallback(int (*fp)(int attrib, void *zig, void *data, void
    **result, unsigned long *length))
{
```

APPENDIX A-continued

What is claimed is:

1. A computer program product for use with a computer system that executes methods, the computer program product comprising:

scope permission setting computer readable program code means, including:

access request receiving computer readable program code means for receiving a request from a first method, executing at a first security level, to be dynamically empowered to generally access second methods, to be executed at a second security level, wherein the second security level is higher than the first security level such that the second methods have access to resources of the computer system that are inaccessible to the first method; and dynamic capability activating computer readable program code means, responsive to the access request receiving code means and including:

static capability determining computer readable program code means for determining if the first method is statically capable of generally accessing methods having the second security level;

dynamic capability indicating computer readable program code means, responsive to a positive determination by the static capability determining code means of the dynamic capability activating code means, for indicating in the activation record for the first method that the first method has been dynamically empowered to generally access methods having the second security level;

dynamic capability determining computer readable code means, responsive to a request by the first method to access a particular one of the second methods, for determining whether the activation record created for the first method includes a dynamic indication that the first method is capable of generally accessing methods having the second security level.

2. The computer program product of claim 1, wherein the dynamic capability determining computer readable program code means is further for determining if the first method is statically capable of generally accessing methods having the second security level.

3. The computer program product of claim 2, and further including access disallowance indicating means, responsive to the dynamic capability determining code means determining that the first method is not statically capable of generally accessing security methods, for indicating a disallowance of the first method to access the particular second method.

4. The computer program product of claim 3, and further including allowance indicating means, responsive to the dynamic capability determining code means determining that the first method is statically capable of generally accessing methods having the second security level and also that the activation record created for the first method includes a dynamic indication that the first method is capable of generally accessing methods having the second security level, for indicating an allowance of the first method to access the particular second method.

5. The computer program product recited in claim 1, further including:

repeating computer readable program code means for causing the dynamic capability determining program code means to operate upon a second method in place of the first method, wherein the second method is a method that caused the first method to be activated.

6. The computer program product recited in claim 4, and further comprising:

traversing computer readable program code means for traversing an activating thread of the first method;

wherein the dynamic capability indicating code means operates upon each particular method in the activating thread of the first method as if the particular method is the first method; and wherein the allowance indicating means and the disallowance indicating means operate responsive to the dynamic capability indicating code means operates upon each particular method in the activating thread of the first method.

7. The computer program product of claim 1, and further comprising:

allowance indicating means, responsive to the dynamic capability determining code means determining that the first method is statically capable of accessing methods having the second security level, for indicating allowance of the first method to access methods having the second security level.

8. The computer program product of claim 1, and further comprising:

method activating computer readable program code means including activation record creating computer readable program code means for creating the activation record for the first method upon invocation of the first method and method executing computer readable program code means for causing the computer to execute the first method.

9. The computer program product recited in claim 8, and further comprising:

method deactivating computer readable program code means including activation record destroying computer readable program code means for destroying the activation record for the first method upon de-invocation of the first method.

10. A process executed by a computer system that executes methods, the process comprising:

a scope permission setting step, including:

receiving an access request from a first method, executing at a first security level, to be dynamically empowered to generally access second methods, to be executed at a second security level, wherein the second security level is higher than the first security level such that the second methods have access to resources of the computer system that are inaccessible to the first method; and activating a dynamic capability for the first method, responsive to the access request receiving step and including:

determining if the first method is statically capable of generally accessing methods having the second security level;

responsive to a positive determination in the static capability determining step of the dynamic capability activating step, indicating in the activation record for the first method that the first method has been dynamically empowered to generally access methods having the second security level;

responsive to a request by the first method to access a particular one of the second methods, determining whether the activation record created for the first method includes a dynamic indication that the first method is capable of generally accessing methods having the second security level.

11. The process of claim 10, wherein the dynamic capability determining step further determining if the first method is statically capable of generally accessing methods having the second security level.

12. The process of claim 11, and further including a step, responsive to the dynamic capability determining code means determining that the first method is not statically capable of generally accessing security methods, of indicating a disallowance of the first method to access the particular second method.

13. The process of claim 12, and further including, responsive to the dynamic capability determining step determining that the first method is statically capable of generally accessing methods having the second security level and also that the activation record created for the first method includes a dynamic indication that the first method is capable of generally accessing methods having the second security level, a step of indicating an allowance of the first method to access the particular second method.

14. The process of claim 10, further including:
   a repeating step that causes the dynamic capability determining program code step to operate upon a second method in place of the first method, wherein the second method is a method that caused the first method to be activated.

15. The process recited in claim 13, and further comprising:
   a traversing step that traverses an activating thread of the first method;
   wherein the dynamic capability indicating step operating upon each particular method in the activating thread of the first method as if the particular method is the first method; and
   wherein the allowance indicating step and the disallowance indicating step operating responsive to the dynamic capability indicating code means operating upon each particular method in the activating thread of the first method.

16. The process recited in claim 10, and further comprising:
   responsive to the dynamic capability determining step determining that the first method is statically capable of accessing methods having the second security level, indicating allowance of the first method to access methods having the second security level.

17. The process of claim 10, and further comprising:
   creating the activation record for the first method upon invocation of the first method and causing the computer to execute the first method.

18. The computer program product recited in claim 17, and further comprising:
   destroying the activation record for the first method upon de-invocation of the first method.

* * * * *